(12) United States Patent
Yu

(10) Patent No.: US 9,918,298 B2
(45) Date of Patent: Mar. 13, 2018

(54) PAGING IN MOBILE NETWORKS USING INDEPENDENT PAGING CELLS AND ACCESS CELLS

(71) Applicant: Orange, Paris (FR)

(72) Inventor: Yifan Yu, Beijing (CN)

(73) Assignee: ORANGE, Paris (FR)

( * ) Notice: Subject to any disclaimer, the term of this patent is extended or adjusted under 35 U.S.C. 154(b) by 45 days.

(21) Appl. No.: 14/778,572

(22) PCT Filed: Mar. 28, 2014

(86) PCT No.: PCT/IB2014/000659
§ 371 (c)(1),
(2) Date: Sep. 18, 2015

(87) PCT Pub. No.: WO2014/155201
PCT Pub. Date: Oct. 2, 2014

(65) Prior Publication Data
US 2016/0286523 A1    Sep. 29, 2016

(30) Foreign Application Priority Data
Mar. 28, 2013    (WO) ................ PCT/CN2013/000359

(51) Int. Cl.
*H04B 7/00*    (2006.01)
*H04W 68/02*    (2009.01)
(Continued)

(52) U.S. Cl.
CPC ........... *H04W 68/02* (2013.01); *H04W 48/16* (2013.01); *H04W 76/02* (2013.01); *H04W 84/045* (2013.01); *H04W 88/06* (2013.01)

(58) Field of Classification Search
CPC ..... H04W 68/02; H04W 88/06; H04W 48/20; H04W 48/16; H04W 84/045; H04W 76/02
(Continued)

(56) References Cited

U.S. PATENT DOCUMENTS

2006/0189331 A1*  8/2006  Lundsjo ................ H04W 68/12
                                                          455/435.2
2009/0197570 A1*  8/2009  Horn ..................... H04W 48/08
                                                          455/410

(Continued)

FOREIGN PATENT DOCUMENTS

CN    102149194 A    8/2011
CN    102413569 A    4/2012
(Continued)

OTHER PUBLICATIONS

International Search Report dated Dec. 5, 2014 for International Application No. PCT/IB2014/000659 filed Mar. 28, 2014, 12 pages.
(Continued)

*Primary Examiner* — Charles Appiah
*Assistant Examiner* — Jaime Holliday
(74) *Attorney, Agent, or Firm* — Knobbe, Martens, Olson & Bear, LLP

(57) ABSTRACT

One embodiment provided herein relates to a method in which a mobile device selects a paging cell whose location area is registered to the network and determines where paging of this mobile device takes place, and selects an access cell to be used by the mobile device when connecting to the network. When the mobile device receives a paging message in the paging cell it sends the paging response through the access cell. Nodes in the mobile network are configured not to reject or filter out paging responses received from mobile devices that this node did not page. Instead, the nodes initiate call setup for such mobile devices.

6 Claims, 6 Drawing Sheets

(51) Int. Cl.
*H04W 48/16* (2009.01)
*H04W 88/06* (2009.01)
*H04W 76/02* (2009.01)
*H04W 84/04* (2009.01)

(58) Field of Classification Search
USPC .................................... 455/515, 458, 426.1
See application file for complete search history.

(56) References Cited

U.S. PATENT DOCUMENTS

2012/0100871 A1* 4/2012 Zhao ................... H04W 68/04
455/456.1

2012/0270556 A1 10/2012 Yin et al.
2012/0295643 A1 11/2012 Arvidsson et al.
2013/0235761 A1* 9/2013 Nanda ................... H04W 68/12
370/254

FOREIGN PATENT DOCUMENTS

| EP | 1 531 561 | 5/2005 |
| EP | 2 203 021 | 6/2010 |
| EP | 2 672 768 | 12/2013 |
| WO | WO 2004/091246 | 10/2004 |
| WO | WO 2009/097015 | 8/2009 |

OTHER PUBLICATIONS

International Search Report dated Jan. 9, 2014 for Application No. PCT/CN2013/000359.

* cited by examiner

PAGING IN MOBILE NETWORKS USING INDEPENDENT PAGING CELLS AND ACCESS CELLS

RELATED APPLICATIONS

This application is the U.S. National Phase of Application No. PCT/IB2014/000659 entitled "PAGING IN MOBILE NETWORKS USING INDEPENDENT PAGING CELLS AND ACCESS CELLS" filed Mar. 28, 2014, which designated the United States and which claims the benefit of PCT/CN2013/000359, filed Mar. 28, 2013.

FIELD OF THE INVENTION

The present invention relates to the field of mobile communications and, in particular, to the field of mobility management in a hierarchical cellular mobile telecommunications network.

BACKGROUND TO THE INVENTION

At present, various different types of cellular mobile telecommunications networks using different technologies co-exist with each other, and further developments of cellular network technology are being planned. Well-known technologies employed in mobile telecommunications networks include GSM ("Global System for Mobile Communications"), UMTS/GPRS ("Universal Mobile Telecommunications System"/"General Packet Radio Service"), CDMA2000®, WiMax ("World Interoperability for Microwave Access"), and so on, and the last few years have seen the introduction of LTE systems ("Long Term Evolution" systems) according to release 8 or release 9 specifications developed by the 3GPP (Third-Generation Partnership Project).

Irrespective of the network technologies being used, an important issue in a mobile cellular telecommunications network is how the mobility of the user equipment (UE) is managed. Although there are differences of detail (and in terminology) between the various technologies, a common feature of mobility management is the need for:
a) a procedure whereby the UE reports its position to the network, and
b) a procedure whereby the network manages to contact the UE when a call is directed to that UE.

In this document, procedures of type a) above shall be referred to as "location update" or "location registration" procedures, and procedures of type b) above shall be referred to as "paging" procedures.

In existing cellular mobile communications networks, location updates are used to enable the network to register information designating a particular region where the UE can be reached. In general, the registered information designates a group of one or more cells covering the UE's location at the time when the location update was performed. In this document, the expression "location area" (LA) shall be used to designate such a region/group of cells, and the expression "location area identifier" (LAI) shall be used to designate a code or identifier that identifies a location area. The cells of a given location area have the same LAI. It will be understood that the invention can be used advantageously without limit to the network technology, such that the expression "location area" and "LAI" cover any comparable region and its identifier irrespective of the nomenclature ("tracking area", etc.) used in the technology concerned.

When the network receives a call for a particular UE, a check is made of the UE's registered location area, and a paging message is broadcast in cells which have the LAI applicable to the registered location area.

It will be understood that the details of the location update procedure and paging procedure will vary between networks using different technologies. FIG. 1 illustrates steps in a typical location update procedure and FIG. 2 illustrates steps in a typical paging procedure.

In step S101 of FIG. 1 it is assumed that the UE enters an idle state at the end of a communications session. In this idle state the UE is camped on the cell which was handling communication with the UE at the time when the UE's last session ended. In the idle state, at certain times the UE monitors the radio transmissions being made by transceivers in its vicinity. This monitoring process detects different cells which could handle communications for this UE and monitors properties of the various cells including, but not limited to, signal strength. In step S102 illustrated in FIG. 1 the UE determines, based on its monitoring, whether or not the UE has entered a location area having a new LAI compared to the cell on which the UE has been camped. If the UE determines that there has not been a change of LAI then the processing returns to step S101. Alternatively, if the UE determines in step S102 that the UE has entered a location area having a new LAI then the process moves to step S103.

In step S103 the UE makes a determination of which would be the best cell to camp on from now on. The UE's assessment of which cell is "best" may be performed by any convenient metric. For example, the UE may assign a rank to each potential cell with which it could communicate, basing the rank on one or more criteria such as signal strength, interference in the cell, and so on. When the UE has selected the "best" cell the UE camps on that cell and may perform various steps including tuning to the control channel of the new cell.

In step S104 of FIG. 1, the UE communicates with the network infrastructure to register the LAI of the cell on which it is newly camped. Following procedures specified in standards applicable to various existing mobile networks, the UE performs the location update by signalling to the new cell so that a radio channel can be assigned and the UE can send a request, through the new cell, for the updated LAI to be registered by the network. The updated LAI may be registered by different components in the network. In general the LAI will be registered by a controller that manages mobility of UEs in a section of the mobile network that includes the new cell. The present description shall refer to controllers which manage mobility of UEs using the expression Mobility Management Entities (MMEs) using the same expression as is used in the LTE standard. The LAI and/or the MME where the UE is registered will also be registered in a network component which constitutes a home server or home register in respect of the subscriber who owns the relevant UE.

It will be understood that if a UE moves rapidly through several different cells belonging to different location areas then, according to the specifications of existing cellular mobile communications networks, the UE will make frequent location updates (see below).

When a call is made to a UE in the mobile telecommunications network, the registered LAI information is used so as to determine where to broadcast a paging message that may be detected by the relevant UE. The steps in a typical paging procedure are illustrated in FIG. 2.

In step S201 illustrated in FIG. 2 the network infrastructure has determined that a call is being made to a specific UE and the home server or home register for that UE is consulted so as to determine the MME where the UE in question is currently registered. In step S202 of FIG. 2, the MME where the UE is currently registered transmits a paging request to transceivers in cells of the location area whose LAI is currently registered for this UE. In step S203 of FIG. 2, the transceivers covering the cells of the location area identified by the relevant LAI broadcast paging messages. In step S204 of FIG. 2, the UE detects a paging message broadcast by a cell C of the location area and determines that the paging message is directed at itself. As a result, in step S205 the UE sends a response to cell C. Various messages are then exchanged between the UE and cell C and between cell C and the network infrastructure so as to set up the subsequent call between the UE and the calling party through cell C (step S206 in FIG. 2).

In recent years many mobile cellular communications networks have developed a hierarchical cell structure including cells in different cell-size classes, that is, including traditional cells of relatively large size, and small cells of relatively much smaller size. Although the cells of the larger cell-size class, macrocells, can have different sizes they generally cover regions whose dimensions are of the order of one or several kilometers. The cells of the smaller cell-size class are often called "femtocells" and generally cover much smaller regions, for example, regions of the order of 10 meters in diameter. Typically, femtocells are installed to improve network coverage, for example: in locations where there is a high density of users, or within a building, or at rural locations where signal coverage would be poor otherwise. Some businesses or organisations install a set of femtocells in a building or campus in order to provide good network coverage throughout the building or campus.

In this document, depending on the context, the expression "cell" is generally used to designate an access node of the radio access network portion of a mobile network, or to designate the region of radio coverage of an access node.

According to the release 8 and release 9 LTE specifications, macrocells include a component designated eNB or eNodeB (which stands for "E-UTRAN Node B" or "Evolved Node B") which is connected to the core network and handles radio communications with the UEs in its locality. Networks according to other technologies have comparable elements: NodeB in UMTS, base station transceiver/radio network controller in GSM, and so on. The corresponding element in an LTE femtocell is designated an HeNB (which stands for "Home eNodeB").

Often a femtocell will connect to the core network using a residential DSL (Digital Subscriber Line), cable broadband connection, optical fibre, wireless last-mile technology, or other connection using Internet Protocol connection and so on, in association with a gateway to the core network. Femtocells operate at frequencies that are licensed to specific telecommunications companies and so, in the same way as access network components, they handle voice and/or data calls for subscribers with the relevant company. Many femtocells are configured so that only specified UEs are allowed to communicate via the femtocell in question. For example, when a femtocell is installed in a home setting, the femtocell may be configured so only mobile phones belonging to family members may access the femtocell. The present description uses the expression "closed subscriber group" (CSG) to designate a list of specified UEs who are the only ones allowed to make use of a given femtocell. A given CSG may be authorized to use a group of femtocells and the femtocells of the group share a common identifier (CSG ID).

Femtocells are small and are often located in clusters, for example in urban environments. Accordingly, when a UE moves about in such an environment, the UE may move rapidly through a relatively large number of femtocells and macrocells and these may be assigned different LAIs. In such circumstances, based on the methods used in conventional mobile cellular telecommunications networks, the UE will make frequent location updates. This is undesirable because the UE uses power to send location updates and so frequent updates lead to a need to re-charge the UE's battery more often. Also, location updates involve the transmission of messages between the UE and the network infrastructure, as well as messages between components in the network infrastructure, so that frequent location updates use up bandwidth and reduce the network's capacity to handle calls.

Various techniques have already been proposed for reducing the number of location updates that will be generated in mobile cellular telecommunications networks which have a hierarchical structure (e.g. which use macrocells and femtocells). For example, it has been recognized that there are circumstances where the same LAI can be assigned to different femtocells in a locality, for example in a case where plural femtocells are installed at different locations within a building belonging to one business all of these femtocells may use the same LAI. Accordingly, there will be no change of LAI when a UE moves from one of these femtocells to another and, thus, no need to make a location update at that time.

However, femtocells which belong to different organisations or households generally are assigned different LAIs from one another, and macrocells are assigned different LAIs from femtocells. Accordingly, as a UE moves between two such femtocells, or between a femtocell and a macrocell, frequent location updates will still be needed. This problem will now be discussed with reference to FIG. 3.

FIG. 3 is a diagram illustrating, in simplified form, an example of a region R of a mobile cellular telecommunications network in which there are two macrocells designated MACRO_1 and MACRO_2, as well as four groups of femtocells, designated CSG_0, CSG_1, CSG_2 and CSG_3. The four groups of femtocells correspond to four respective closed subscriber groups. As illustrated in FIG. 3, there are three femtocells for each of the closed subscriber groups. The femtocells of groups CSG_0 and CSG_1 are all located within the coverage region of macrocell MACRO_1. The femtocells of groups CSG_2 and CSG_3 are all located within the coverage region of macrocell MACRO_2. A network component, designated MME in FIG. 3, manages the mobility of UEs in the region R. A first UE, identified by a unique identifier (designated IMSI_1 in FIG. 3), is connected to the mobile cellular telecommunications network but is not located in region R, whereas a second UE, identified by its own unique identifier (designated IMSI_2 in FIG. 3) is located in region R and moves around within region R. These UEs shall be referred to from now on using their identifiers.

In the example illustrated in FIG. 3, a single location area is assigned to the two macrocells MACRO_1 and MACRO_2 and so these macrocells both have the same LAI, designated LA_1 in FIG. 3.

In the example illustrated in FIG. 3, a single location area is assigned to the femtocells of groups CSG_0 and CSG_1 and so the femtocells of groups CSG_0 and CSG_1 all have the same LAI, designated LA_2 in FIG. 3. It will be noticed that the femtocells of groups CSG_0 and CSG_1 are not assigned to the same location area as the macrocell MACRO_1 even though femtocells of groups CSG_0 and CSG_1 are located within the coverage region of macrocell MACRO_1.

In the example illustrated in FIG. 3, a single location area is assigned to the femtocells of groups CSG_2 and CSG_3 and so the femtocells of groups CSG_2 and CSG_3 all have the same LAI, designated LA_3 in FIG. 3. In this case also, it will be noticed that the femtocells of groups CSG_2 and CSG_3 are not assigned to the same location area as the macrocell MACRO_2 even though the femtocells of groups CSG_2 and CSG_3 are located within the coverage region of macrocell MACRO_2.

Consider a case where IMSI_2 is initially located at the position marked ① in FIG. 3 and moves along a path indicated by the dashed arrow A in FIG. 3 to the position marked ② in FIG. 3. At the time when IMSI_2 starts moving at position ①, the last communication session IMSI_2 engaged in has terminated with IMSI_2 attached to a femtocell of group CSG_3. The mobility management entity MME of the network has LA_3 registered to identify the location area of IMSI_2. IMSI_2 is camped on one of the femtocells of group CSG_3 but can detect transmissions from the other femtocells of CSG_3 and from the macrocell MACRO_2.

When IMSI_2 moves out of range of the femtocells of CSG_3 travelling along path A, it enters an area where IMSI_2 is only reachable by MACRO_2. IMSI_2 chooses to camp on cell MACRO_2 and detects that the LAI for MACRO_2 is different from the LAI of the cell on which IMSI_2 was previously camped. Accordingly, IMSI_2 communicates with MACRO_2 to request performance of a location update that will register the LAI of MACRO_2 (i.e. LA_1) to the applicable mobility management entity MME. As IMSI_2 continues to move along path A it enters an area covered by the femtocells of CSG_2 and determines that it should camp on a femtocell of CSG_2. IMSI_2 detects that the LAI of the chosen CSG_2 femtocell is different from the LAI of the cell on which IMSI_2 was previously camped, and so communicates with the chosen CSG_2 femtocell to request performance of a second location update, this time to register LA_3 to the MME.

When IMSI_2 moves out of range of the femtocells of CSG_2 travelling along path A, it enters an area where, once again, IMSI_2 is only reachable by MACRO_2. IMSI_2 chooses to camp on cell MACRO_2, detects that the LAI for MACRO_2 is different from the LAI of the cell on which IMSI_2 was previously camped and communicates with MACRO_2 to request performance of a third location update, on this occasion to register LA_1 to the mobility management entity MME. As IMSI_2 continues to move along path A it enters an area where IMSI_2 is only reachable by MACRO_1. IMSI_2 chooses to camp on cell MACRO_1, but detects that the LAI for MACRO_1 is the same as the LAI for the previous cell on which IMSI_2 was camped and so no location update is required. Accordingly IMSI_2 does not send a location update request at this time.

As IMSI_2 continues to move along path A it enters an area covered by the femtocells of CSG_1 and determines that it should camp on a femtocell of CSG_1. IMSI_2 detects that the LAI of the chosen CSG_1 femtocell is different from the LAI of the cell on which IMSI_2 was previously camped, and so communicates with the chosen CSG_1 femtocell to request performance of a fourth location update, this time to register LA_3 to the MME. When IMSI_2 moves out of range of the femtocells of CSG_1 travelling along path A, it enters an area where, once again, IMSI_2 is only reachable by MACRO_1. IMSI_2 chooses to camp on cell MACRO_1 and detects that the LAI for MACRO_1 is different from the LAI of the cell on which IMSI_2 was previously camped. Accordingly, IMSI_2 contacts MACRO_1 to request performance of a fifth location update, to register the LAI of MACRO_1 (i.e. LA_1) to the mobility management entity MME. As IMSI_2 continues to move along path A it enters an area covered by the femtocells of CSG_0 and determines that it should camp on a femtocell of CSG_0. IMSI_2 detects that the LAI of the chosen CSG_0 femtocell is different from the LAI of the cell on which IMSI_2 was previously camped, and so contacts the chosen CSG_0 femtocell to request performance of a sixth location update, this time to register LA_2 to the MME.

It will be understood from the above explanation that the location update techniques that are applied in conventional mobile cellular networks may require a large number of location updates to be performed as a UE moves around in a region covered by macrocells and femtocells. In the example discussed above with reference to FIG. 3, IMSI_2 performs 6 location updates as it moves along path A from location ① to location ②.

Considering paging procedures in the region R illustrated in FIG. 3: if IMSI_1 places a call to IMSI_2 when IMSI_2 is at position ① at the end of path A, the MME has LA_2 registered as the identifier of the location area for IMSI_2 and so directs a paging request to the radio access network components covering the cells having the location area identifier LA_2. In this case, the femtocells of CSG_0 and CSG_1 are the cells having the location area identified LA_2 and so they respond to the paging request from the MME by broadcasting paging messages which include an identifier of IMSI_2. Let us say that IMSI_2 is camped on a femtocell FC of CSG_0 and detects a paging message identifying IMSI_2, broadcast by femtocell FC. In this case IMSI_2 sends its response to femtocell FC and a session connecting IMSI_1 to IMSI_2 is then established through femtocell FC.

In the previous example, when IMSI_2 is at position ② in FIG. 3 the MME sends requests for paging messages to be broadcast to IMSI_2 from six femtocells, that is the femtocells of CSG_0 and CSG_1. In the case of closed subscriber group femtocells, it is possible to obtain a reduction in the number of femtocells broadcasting paging messages by taking into account which CSGs the called UE belongs to. For example, if IMSI_2 in FIG. 3 is only a member of CSG_1 and CSG_3 then paging overhead may be reduced by making sure that paging messages are broadcast only in femtocells which, as well as having the appropriate LAI, also belong to a CSG that IMSI_2 is authorized to access. Thus, in the previous example, when IMSI_2 is at position ② in FIG. 3 the MME could request paging messages to be broadcast to IMSI_2 from only the three femtocells of CSG_1 because, although the femtocells of CSG_0 are in the appropriate location area, IMSI_2 is not authorized to access CSG_0.

In conventional mobile cellular communications networks, if a single location area includes a large number of macrocells or femtocells this can reduce the number of location updates that are performed but, conversely, a large number of cells may need to broadcast paging messages when a call is directed to a UE in this location area. However, if a single location area includes only a small number of macrocells or femtocells then, although this can reduce the paging load, there is an increased requirement for frequent location updates.

The present invention has been conceived in the light of the above problems.

SUMMARY OF THE INVENTION

In cellular mobile networks according to existing specifications the dynamic cell selection that is performed by UEs is a selection of a single cell that serves both to define the location area that will be registered for this UE (and in which this UE will be paged) and serves to define the cell this UE will access when it seeks to communicate with the network. The present inventor has realized that advantages can be obtained by breaking the link between the cell that is used for paging a UE and the cell that the UE employs for accessing the network.

In cellular mobile networks according to existing specifications, the UEs monitor transmissions from available cells and select a cell to camp on by considering which cell offers the best access capabilities, notably in terms of the communications quality offered by the cell. For example, the UE may measure properties of transmissions made by the available cells (e.g. transmissions made on a control channel) and select a cell which offers the best power or signal-to-noise ratio at the UE, or the least interference, and so on. As another example the UE may base its assessment of cell access capabilities or cell quality on a parameter that is calculated by a cell and transmitted to the mobile device (for example the cell may measure or compute a quality parameter based on the characteristics—signal strength, and so on—of a signal transmitted by the mobile device).

The location area of the selected cell will be registered to the network and the network will page the UE in the registered location area. Furthermore, when the UE accesses the network (notably to request a location update or respond to a paging message), the UE will access the same selected cell.

Furthermore, in cellular mobile networks according to existing specifications, if a cell base station which did not transmit a paging message to a UE receives a paging response message from that UE the base station is designed to reject or filter out the paging response message.

The present invention provides a method of managing a paging procedure in a cellular mobile network comprising different areas where mobile devices may be located, each location area of the network including at least one cell, the method being performed by a mobile device connected to said network, the method comprising the acts of: detecting available cells of the network, selecting a first cell of the network as a paging cell whose location area is to be registered to the network as the paging area to be used by the network when paging the mobile device, and selecting, as an access cell to be accessed by the mobile device when connecting to the network, a second cell of the network that may be the same as, or different from, said first cell, wherein the mobile device is configured to select the paging cell taking into account the paging capabilities of the detected cells and to select the access cell taking into account the access capabilities of the detected cells, and the mobile device is configured to respond to a paging message received through the selected paging cell by contacting the network through the selected access cell.

It will be understood that a mobile device which implements paging-procedure management methods according to certain embodiments of the invention may well select a paging cell that is different from the selected access cell, and this paging cell is selected taking into account the paging capabilities of the detected cells instead of being chosen based on the access capabilities of the available cells as it was in past networks. Accordingly, because the paging cell is selected based specifically on paging capabilities, the efficiency of the paging procedure is increased. Moreover, this improvement in paging efficiency is not detrimental to the quality of the access the mobile device obtains to the network because the access cell is selected separately from the paging cell and the selection thereof is based on the access capabilities of the detected cells.

In paging procedure management methods according to certain embodiments of the invention a paging-capability parameter value and an access-capability parameter value are associated to each detected cell, and the paging cell and access cell are selected from among a group of detected cells that have an associated access-capability parameter value equal to or greater than a predefined value. Within this group of cells, the cell associated to the highest value of the paging-capability parameter is selected as the paging cell and the cell associated to the highest value of the access-capability parameter is selected as the access cell.

The quality of the connections between the mobile device and the cells which page it or that it accesses is assured by selecting the paging cell and access cell from among detected cells that are associated with a certain minimum value of the access-capability parameter. Furthermore, by basing the choice of paging cell and access cell on the values of respective parameters which quantify paging capabilities and access capabilities of the available cells, an optimal choice of paging cell and access cell is likely to be made.

The particular metric that is used to evaluate paging capabilities may be set according to the network designer's objectives. For example, when the network designer seeks to ensure that the network infrastructure does not become overloaded by location-update requests, then he may configure the method to assess paging capabilities based on a parameter that quantifies the cell's ability to handle multiple location-updates simultaneously. Using this metric, paging cells are selected preferentially from among cells that are able to handle a large location-update load. As another example, when the network designer seeks to reduce the battery consumption in the UE he may configure the method so that paging capabilities are assessed based on a parameter that enables the number of location updates to be reduced, for example because it favours preferential selection of cells that cover large geographical regions.

In paging procedure management methods according to certain of the latter-mentioned embodiments of the invention, the mobile device is connected to a cellular mobile network comprising macrocells and femtocells, the associating step associates a higher paging-capability parameter value to macrocells than to femtocells and associates a cell-quality value to cells as said access-capability parameter value, and the selecting step selects as the paging cell the macrocell having best paging capabilities or having highest quality among the macrocells in said group or, if no macrocell is in said group, selects the femtocell having highest quality out of the femtocells in said group.

In a network containing macrocells and femtocells, location-update and paging that is based preferentially on macrocells is likely to entail a smaller number of location-updates than location-updating/paging based on femtocells, because of the greater dimensions of the macrocells. Because the methods of the invention select the paging cell without being obliged to select the cell that has best access capabilities (e.g. best quality), it becomes possible to select macrocells for paging even in circumstances where femtocells are available that offer better quality (provided that the macrocell quality meets a minimum quality standard).

In paging procedure management methods according to certain embodiments of the invention the cells broadcast information quantifying their paging capabilities and the mobile device takes this broadcast information into account when associating a paging-capability parameter value to detected cells. The paging capabilities of cells tend to depend on parameters such as the geographical extent of the cells' location areas, the geometry of the cellular network, and other network-side factors. Accordingly, the choice of paging cell is likely to be optimized in cases when it is based on information sent by the cells to indicate their paging capabilities.

In paging procedure management methods according to certain embodiments of the invention, when the mobile devices associate an access-capability parameter value to detected cells the mobile devices take into account parameters indicative of the communications quality of the detected cells. The communications quality offered by a cell is one of the main factors which determine how good a choice this cell is for a mobile device to use to connect to the network and existing mobile devices are already configured to assess communications quality (e.g. by measuring the signal to noise ratio of each cell). However, the invention is not limited to methods in which access capabilities are assessed in terms of communications quality of the cells; other factors may be taken into account, for example the existing load due to traffic in the cell.

The present invention further provides a paging procedure management method performed by a node of the cellular mobile network, the method comprising the acts of: receiving a paging response message sent by a mobile device, determining that the paging response message received from the mobile device is not a response to a paging message sent by this node, and reacting, to a paging response message that is determined not to be a response to a paging message sent by this node, by initiating a call set-up procedure for the mobile device through this node.

By configuring a network node not to reject a paging response message in the case where that paging response message does not reply to a paging message sent by this node, it becomes possible to set an access cell for a mobile device that is different from the cell which determines where the mobile device is paged. This enables the choice of paging cell and access cell to be optimized.

In paging procedure management methods according to certain embodiments of the invention and performed by a node of the cellular mobile network, a given node generally does not have sufficient information to be able to set up a call for a mobile device as a reaction to receipt of a paging response message from the mobile device if this node did not send the paging message to which the paging response message replies. Accordingly, it can be beneficial to configure the node so that it reacts to such a paging response message by contacting other components in the network in order to obtain the necessary missing information.

The present invention yet further provides a mobile device configured to be connectable to a cellular mobile network comprising different areas where mobile devices may be located, each location area of the network including at least one cell, the mobile device comprising: a receiver configured to detect transmissions from cells available to handle communications with the mobile device; and a processor configured: to select a first cell of the network as a paging cell whose location area is to be registered to the network as the paging area to be used by the network when paging the mobile device, and to select, as an access cell to be accessed by the mobile device when connecting to the network, a second cell of the network that may be the same as, or different from, said first cell, wherein the processor is configured to select the paging cell taking into account the paging capabilities of the detected cells and to select the access cell taking into account the access capabilities of the detected cells; wherein the mobile device is configured to respond to a paging message received through the paging cell selected by the processor by contacting the network through the access cell selected by the processor.

A mobile device configured as indicated above can make independent choices of its paging cell and access cell. Accordingly, both of these cells can be chosen optimized for its specific function.

The present invention still further provides a node in a cellular mobile network, the node comprising: a transmitter module for sending paging messages, a receiver module for receiving a paging response message sent by a mobile device, and a processor for determining whether a paging response message received from a mobile device is a response to a paging message sent by this node, wherein the processor is configured to react to a paging response message that is determined not to be a response to a paging message sent by this node by initiating a procedure for setting up a call for the mobile device through this node.

When a network node can react to a paging response message received from a mobile device to which it did not send the paging message, it becomes possible to set a different paging cell and access cell for mobile devices, enabling the cell choices to be optimized to the individual functions.

The present invention yet further provides a cellular mobile network wherein at least one network node is configured to react to a paging response message received from a mobile device and determined not to be a response to a paging message sent by this node by initiating a procedure for setting up a call for the mobile device through this node.

In certain embodiments of cellular mobile network of the latter kind, the paging cells for the mobile devices can be chosen independently of the choice of access cells, increasing the efficiency of the paging process without sacrificing access characteristics when the mobile device access the network.

Yet further embodiments of the invention provide computer programs comprising instructions for performing the above-mentioned methods, and recording media storing the computer programs.

Further features and advantages of the present invention will become apparent from the following description of certain embodiments thereof, given by way of example only, not limitation, and illustrated with reference to the drawings described hereinafter.

BRIEF DESCRIPTION OF THE DRAWINGS

FIG. 7 shows examples of a configuration of macrocells and femtocells connected to network infrastructure, in which:

DETAILED DESCRIPTION OF CERTAIN EMBODIMENTS

Certain embodiments of the present invention will now be described with reference to a cellular mobile communications network that includes macrocells and femtocells. However, it is to be understood that the invention is not limited to networks including macrocells and femtocells. Indeed, application of the present invention can provide advantages in cellular mobile networks that include cells of only one size class (or, even, cells of uniform size).

Figure 4:
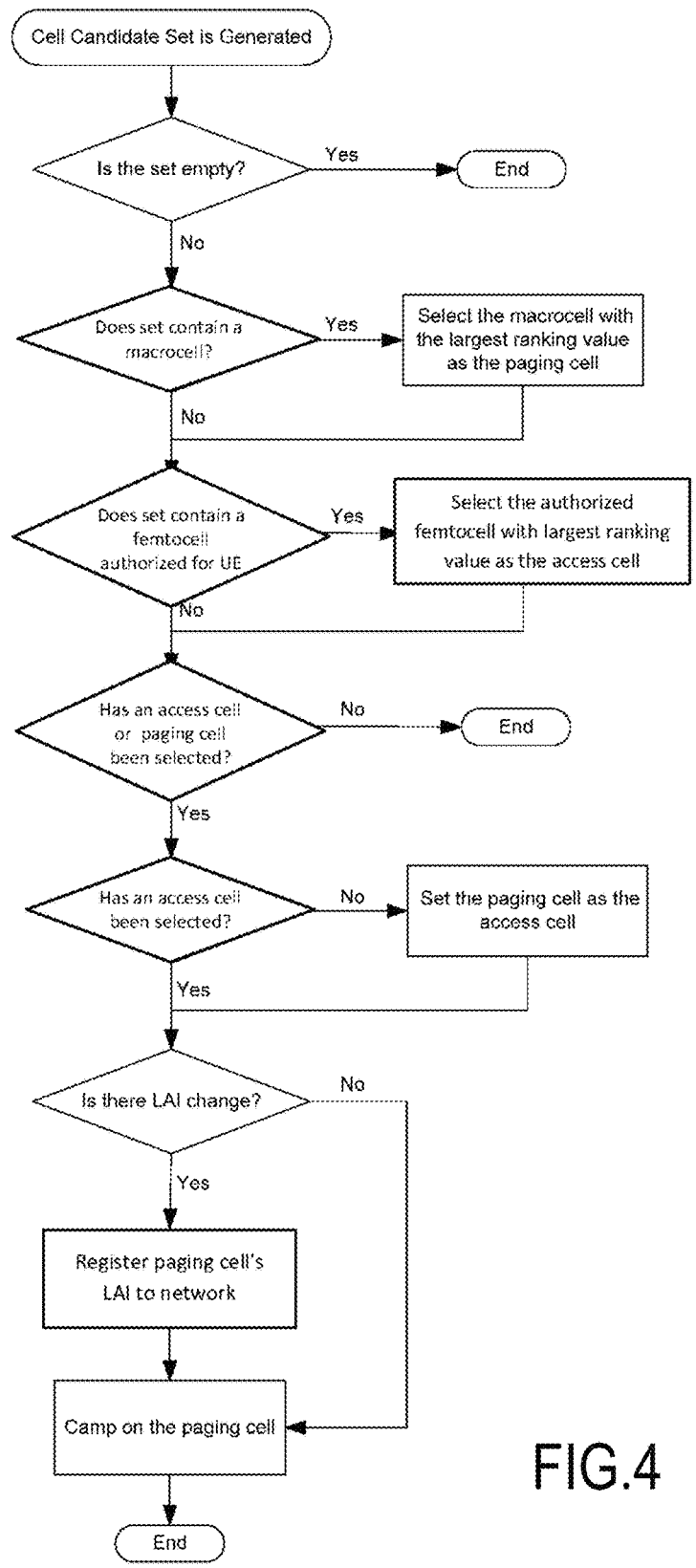
FIG. 4 is flow diagram illustrating steps in a method selecting a paging cell and access cell for a mobile device, and performing location update, according to one embodiment of the present invention.

FIG. 4 is a flow chart illustrating steps a method according to one embodiment of the invention. Specifically, according to this method the UE is configured to select two types of cells in its cell selection or reselection procedure. One of the selected cells is termed the paging cell, the other is termed the access cell. As indicated above, according to certain paging procedure management methods embodying the invention, the UE selects a paging cell based on considering the paging capabilities of the different available cells. Likewise, the UE selects the access cell based on a consideration of the access capabilities of the different available cells. In substantially any cellular mobile networks where at least some of the network cells overlap (such that the UE has a choice of which cell to use), it can be advantageous to de-couple the selection of the paging cell and the access cell.

Different techniques can be used for assessing the paging capabilities of cells. In the example discussed below with reference to FIG. 4, the assessment of the paging capabilities of the cells is based on a parameter designated "paging cost": a low paging cost means that this cell has good paging capabilities whereas a high paging cost means that this cell has poor paging capabilities. The method illustrated by FIG. 4 focuses on enabling a UE in idle mode to camp on a cell that is determined as having the minimum paging cost as long as it is available.

The invention is not limited to the case where paging capabilities are assessed by considering a paging cost. Other approaches may be used. For example, cells can be ranked in different classes based on their paging capabilities and a UE may then select as its paging cell the available cell that is ranked in the highest class.

In certain cases a parameter quantifying the paging capabilities of the available cells may be computed by the UE. However, in many cases information quantifying the paging capabilities of cells is transmitted by the cells themselves (for example in a broadcast channel). The parameter that quantifies paging capabilities may be set manually, for example based on the configuration of the network. However the invention is not limited to manual setting of the paging-capability parameter: in certain cases the paging capability parameter may be set dynamically, for example based on current conditions in the network. Furthermore, the invention is not limited to the case where a single parameter is used to quantify paging capabilities of cells: in suitable cases an overall ranking, in terms of paging performance, may be derived based on a plurality of different parameters relating to paging capability.

In a similar way, different techniques can be used for assessing the access capabilities of cells. In the example discussed below with reference to FIG. 4, the assessment of the access capabilities of the cells is based on measurements the UE makes on signals transmitted by the various available cells. However, the invention is not limited to the case where access capabilities are assessed based on signal measurements made by the UE: for example the cells may broadcast information quantifying their current access capabilities, for example taking into account the load in the cell at that time.

As shown in FIG. 4, the paging cell and access cell are selected from a cell candidate set detected by the UE. The candidate set is composed of the cells that can be potentially chosen for serving the UE (because they offer a communications quality equal to or exceeding a minimum acceptable standard). The paging cell is the cell that the UE will camp on and wait for a paging message, while the access cell is where the UE is to transmit data and establish a session. When there is an available paging cell in the candidate cell set detected by the UE, the location area of the paging cell is always used as the registered location area for the UE.

In the example illustrated by FIG. 4, a first level of paging cost is associated with using macrocells as paging cells and this first level of paging cost is lower than a second level of paging costs that is associated with using femtocells as paging cells. The lower level of paging cost that is associated with macrocells in this example reflects the fact that, in general, fewer location updates are required when a UE's location is tracked in terms of macrocells compared to the number of location updates required when the UE's location is tracked in terms of femtocells. Accordingly, in the example illustrated by FIG. 4, the UE selects a macrocell as paging cell even in the presence of an available femtocell offering better communication quality (provided that the communications quality offered by the macrocell is at least equal to a minimum standard).

In the example illustrated in FIG. 4, different paging costs are associated with different macrocells (although all the macrocells have paging costs that are lower than the paging costs associated with femtocells in this example). For instance, different paging costs may be associated with different macrocells based on size differences between the macrocells. When the paging cell is being selected in a case where plural macrocells are available then, in the FIG. 4 example, the macrocell having the lowest paging cost is chosen to be the paging cell. In the event of a tie or draw between plural macrocells having the lowest paging cost, any convenient criterion may be used to decide which of these macrocells to set as the paging cell.

In the example illustrated in FIG. 4, femtocells are considered to have better access capabilities than macrocells, so a femtocell will be selected as access cell unless none of the available femtocells that the UE is authorized to access offer sufficiently-good signal quality. If no suitable femtocells are available but a paging cell has been selected, then the paging cell is set as the access cell also. If plural authorized femtocells of sufficient signal quality are available the highest-ranking femtocell in terms of access-capabilities is chosen to be the access cell.

In a network comprising macrocells and femtocells, the example method illustrated by FIG. 4 can be implemented in a simple manner by configuring the UEs to recognize whether cells are macrocells or femtocells and, based on the recognized cell type, to assign a higher paging-capability to macro-cells than to femtocells. The UEs may then be configured to choose the paging cell preferentially from the available macrocells, rather than from available femtocells (provided that any macrocell is available that offers the minimum acceptable quality standard). When more than one macrocell is available, the macrocell having best quality may be selected as paging cell if all the macrocells have been assigned the same paging-capability value. If no macrocell is available then the highest quality femtocell may be selected as paging cell.

According to this implementation example, the UEs may be further configured to assign a higher access-capability to femtocells than to macrocells, based on recognition of the cell type, and to choose the access cell preferentially from among the femtocells (provided that any femtocell is available that offers the minimum acceptable quality standard). When more than one femtocell is available, the femtocell having best quality may be selected as access cell. If no femtocell is available then the highest quality macrocell may be selected as the access cell (and, in general, this highest-quality macrocell will have been selected as the paging cell).

There are various ways in which a UE can determine whether a cell is a macrocell or a femtocell and any convenient method can be employed in this implementation example. For instance, the UE may determine the cell type based on the fact that the value of the cell identity is selected out of different ranges for macrocells and femtocells according to existing network specifications.

FIG. 4 illustrates a combined selection procedure which serves to make (or verify/refresh) the selection of the paging cell and the access cell. However, the invention is not limited to the case where a single combined procedure selects the paging cell and the access cell: separate procedures may be used to make/update the selection of the paging cell and the access cell and, in particular, the individual selection procedures do not need to be run at the same times or with the same frequency.

The procedure(s) for selecting (or updating the choice of) the paging cell and access cell may be triggered in various ways including but not limited to the following examples: the selection/update may be run at intervals (e.g. run every 10 minutes, run every time the mobile has completed a specified process in idle mode, and so on), and/or the selection process could be triggered by an event (for instance, detection of power-up of the mobile device, detection of a change in cell quality, and so on).

According to the FIG. 4 example, when the location update mentioned above is performed the UE contacts the base station of the femtocell that has been selected as its access cell, to request registration of the LAI of the macrocell where the UE is residing (i.e. the LAI of the macrocell that has been selected as the paging cell).

According to this example, if a call is directed to the UE, the network will request broadcast of paging messages by transceivers in the location area identified by the registered LAI, that is, the transceivers in the same location area as the selected paging cell. Upon the receipt of the paging message the UE establishes the session in the femtocell that has been selected as its access cell (provided that the latter femtocell is still available). Certain detailed examples of paging processes that may be employed in embodiments of the invention will now be discussed with reference to FIGS. 5 and 6

Figure 5:
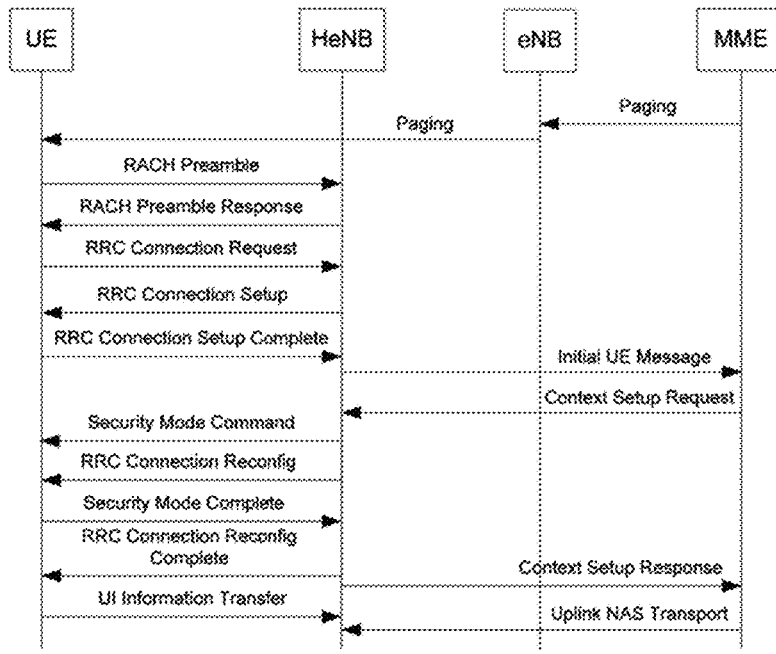
FIG. 5 is a flow diagram illustrating steps in one example of a paging procedure according to an embodiment of the present invention.
Figure 6:
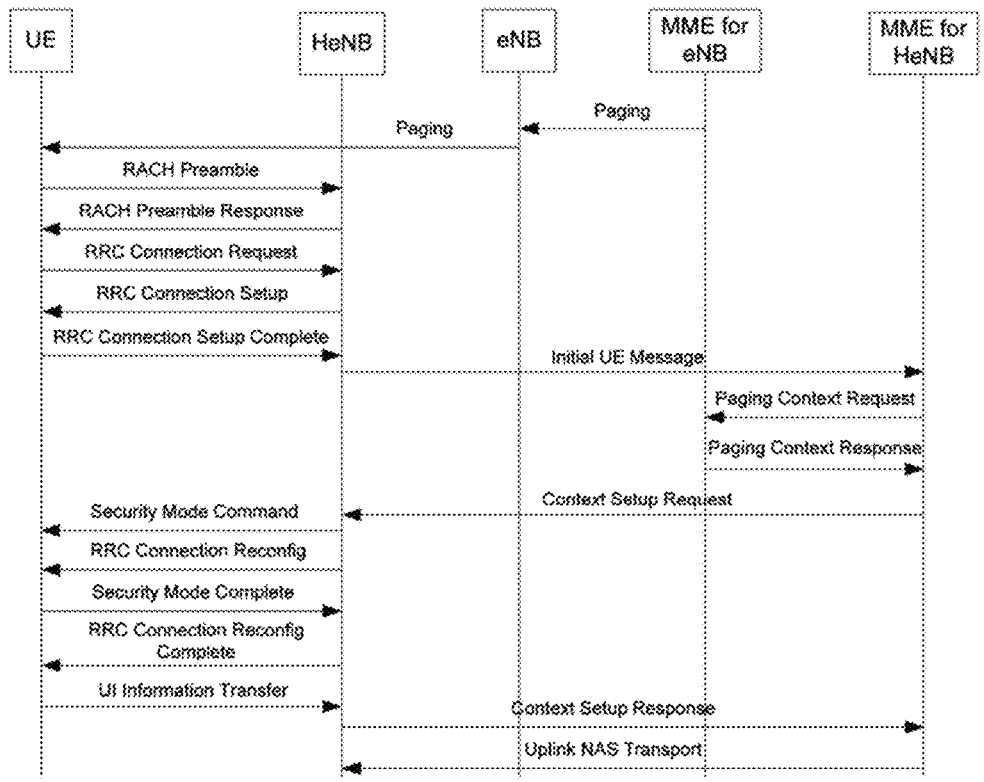
FIG. 6 is a flow diagram illustrating steps in another example of a paging procedure according to an embodiment of the present invention.

The examples of FIGS. 5 and 6 make reference to some processes that take place during paging according to the current LTE specification, but these processes are modified here because the UE is configured to respond to a paging message through its selected access cell rather than through the paging cell which actually sent out the paging message. The skilled person will readily understand the corresponding modifications that should be made to paging processes according to technologies other than LTE.

In the following description HeNB refers to the small base station for a femtocell and eNB represents the base station for a macrocell. In both FIGS. 5 and 6 it is assumed that the mobile device UE has selected the femtocell served by HeNB as its access cell and has selected the macrocell served by eNB as its paging cell. It is further assumed that UE has registered the LAI of its selected paging cell eNB with the network (notably, with the MME serving eNB). Accordingly, when the MME for eNB is notified of an incoming call directed to UE, the MME transmits a paging request to eNB, and eNB broadcasts an appropriate paging message.

FIG. 5 illustrates a first scenario in which the eNB and HeNB both connect to the same mobility management entity MME. FIG. 6 illustrates a second scenario in which the eNB and HeNB connect to different MMEs.

As illustrated in FIG. 5, the UE receives the paging message transmitted by eNB and responds through its selected access cell HeNB. In this embodiment of the invention HeNB is configured not to reject the paging response received from UE even though HeNB did not transmit the paging message that prompted UE's transmission of the paging response. Accordingly, HeNB exchanges certain initial messages with UE, notably to setup a radio channel RRC. However, in order for call setup to proceed, HeNB lacks certain of the information elements that normally would be possessed by a node which broadcasts a paging message to UE (for example, information relating to security settings, information necessary for context setup to be performed). Accordingly, in order to continue with call setup HeNB contacts its MME, via a message designated "Initial UE Message" providing MME with sufficient information to identify the called UE.

Because HeNB's MME also connects to the paging cell eNB which paged UE, this MME has the information necessary for call setup to the paged UE. Accordingly, MME sends to HeNB a "Context Setup Request" message which notifies HeNB of parameters/information required so that HeNB can accomplish subsequent steps in the call setup procedure. For example MME may provide HeNB with encryption keys and algorithm details so that HeNB can transmit an appropriate Security Mode Command to the UE, and MME may provide HeNB with parameters and information that enable HeNB to make any appropriate changes to the configurations of the logical, transport and physical channels via a RRC Connection Reconfiguration command. When the necessary context setup operations have been completed HeNB informs MME and call setup continues as normal.

According to the scenario illustrated in FIG. 6, once again the access cell HeNB selected by UE is configured to communicate with UE even when UE sends HeNB a paging response in a case where HeNB did not send the paging message. However, in this case, when HeNB contacts its MME (designated MME for HeNB in FIG. 6) because HeNB lacks certain of the information elements needed for the call setup procedure, MME for HeNB is not in possession of the missing information. This is because the paging cell eNB is served by a different mobility management entity (designated MME for eNB in FIG. 6).

In the example illustrated in FIG. 6, two new signalling messages are defined to enable the necessary coordination between the MMEs connecting to eNB and HeNB, respectively. To be specific, MME for HeNB sends a Paging Context Request to MME for eNB in order to acquire from MME for eNB the information necessary for generating a Context Setup Request. MME for eNB sends the context of the paging request that it had issued to eNB to MME for HeNB in a message designated Paging Context Response. MME for HeNB can now send to HeNB the information HeNB requires in order to proceed with call setup. Thus, the paging processes illustrated in FIG. 6 enable the session between the called UE and the caller to be established through the called UE's selected access cell HeNB even when the MME for HeNB actually doesn't broadcast the paging request.

Figure 7A:
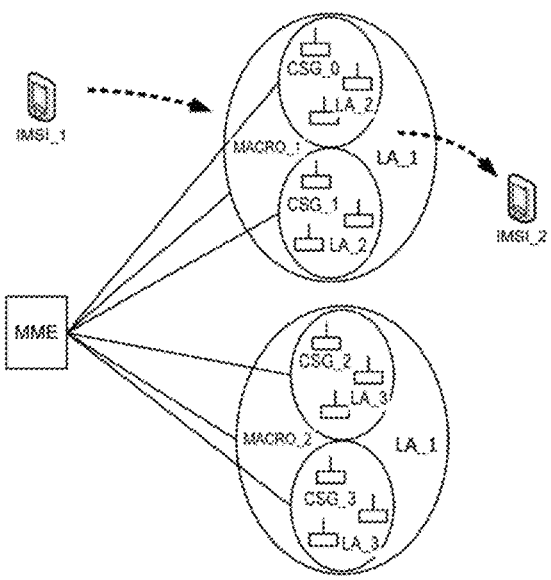
FIG. 7A illustrates a configuration of macrocells and femtocells all connected to a common mobility management entity.

For the purposes of illustration, an example of an overall location update/paging procedure, performed directly through an MME, will now be described referring to FIG. 7A. FIG. 7A illustrates the configuration of a portion of a network that includes a mix of macrocells and femtocells as in FIG. 3. Once again it is assumed that the UE designated IMSI_2 initially resides in the area LA_3 which is covered both by macrocell MACRO_2 and the femtocells of CSG_3. The LAI of MACRO_2 is LA_1, and the LAI of CSG_3 is LA_3. Because IMSI_2 chooses MACRO_2 as its paging cell (based on an assessment method that assigns lower paging cost to macrocells compared to femtocells) IMSI_2 registers LA_1 in a location update, registering LA_1 to MME through MACRO_2. However a suitable femtocell of CSG_3 is chosen as the access cell by IMSI_2 because the femtocells of CSG_3 are assessed to have better access capabilities than MACRO_2. Despite the choice of a CSG_3 femtocell as access cell, in this example IMSI_2 stills sends the location update request through MACRO_2, to avoid the possibility of the network infrastructure registering the LAI of CSG_3 to identify the location area where IMSI_2 should be paged.

As IMSI_2 moves to CSG_1, it crosses the femtocells of CSG_2, CSG_1 and CSG_0 sequentially. However IMSI_2 does not launch a location update because, where MACRO_2 and MACRO_1 are chosen as the paging cell of IMSI_2, IMSI_2 still camps on the location area designated by LA_1 Finally, IMSI_2 resides in the area both covered by CSG_0 and MACRO_1. At this location IMSI_2 selects CSG_0 as its access cell based on its good access capabilities.

Figure 1:
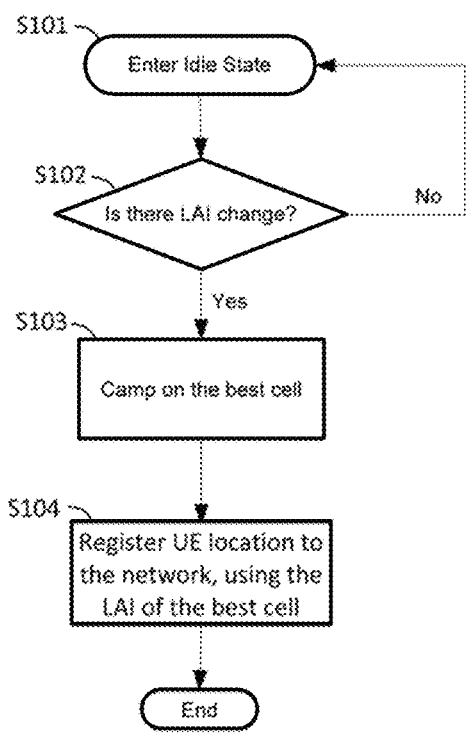
FIG. 1 is a flow diagram illustrating steps in a typical location update procedure in a mobile cellular telecommunications network.
Figure 2:
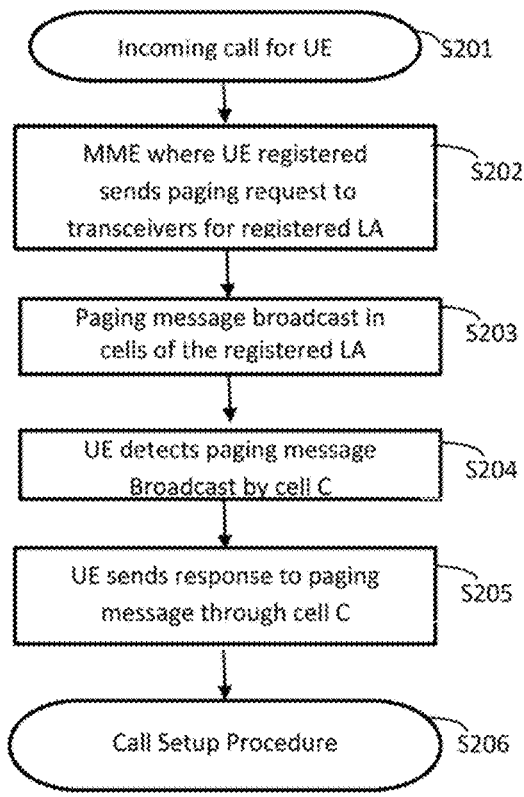
FIG. 2 is a flow diagram illustrating steps in a typical paging procedure in a mobile cellular telecommunications network.
Figure 3:
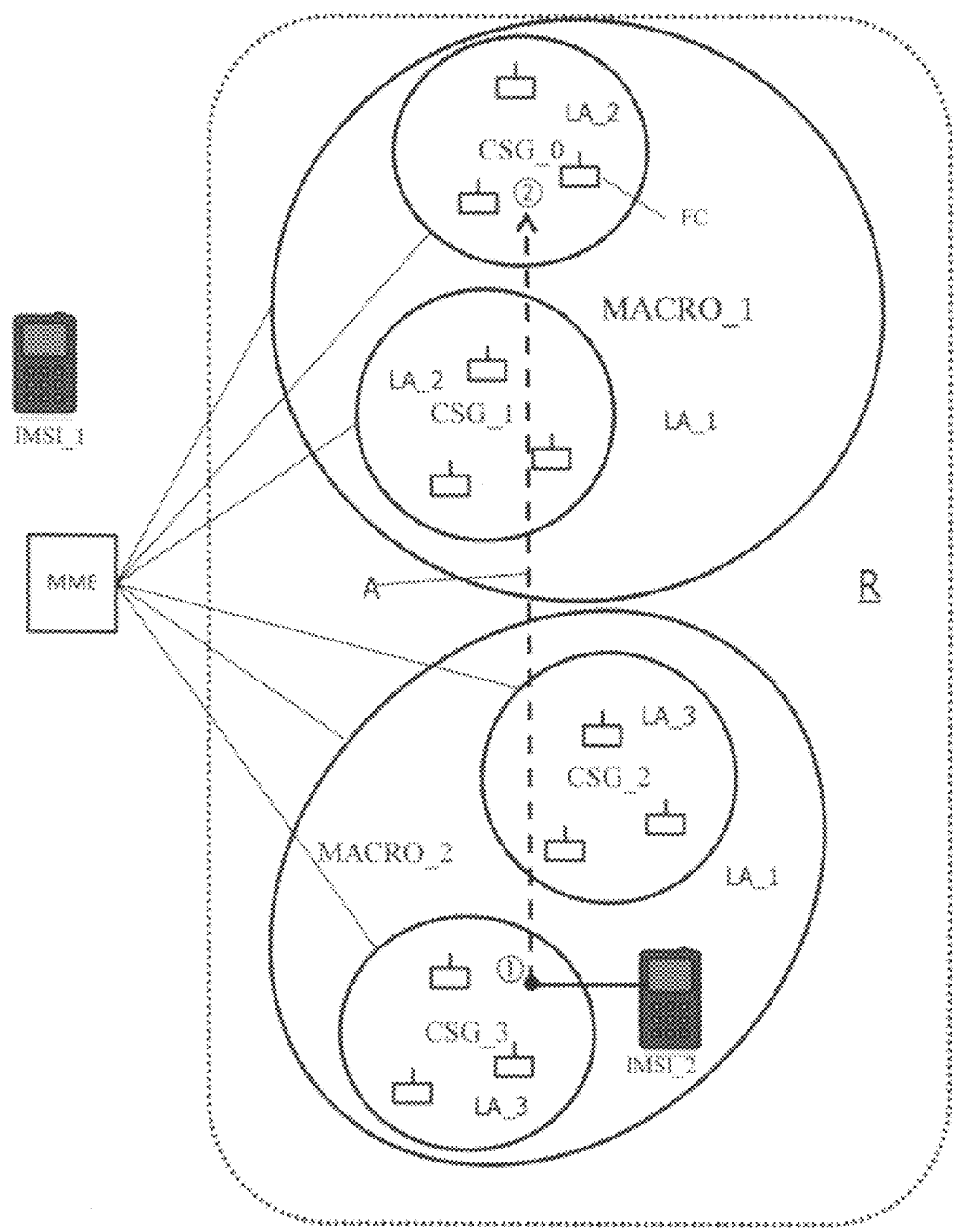
FIG. 3 is a diagram illustrating an example of a configuration of macrocells and femtocells in a hierarchical mobile cellular telecommunications network.

A comparison of the above-described example with the description of FIG. 3 shows that the methods according to the invention can produce a drastic reduction in the number of location updates that are required as a mobile device moves in a cellular mobile network.

When a UE designated IMSI_1 issues a calling request to MME to call IMSI_2, because MME knows that the location area designated LA_1 is registered for IMSI_2, the MME forwards a paging request to MACRO_1 and MACRO_2. The paging request is finally received by IMSI_2 in MACRO_1. However, IMSI_2 sends back the paging response through CSG_0 because this cell is chosen as the access cell. MME then establishes the session from IMSI_1 to IMSI_2 through CSG_0.

Figure 7B:
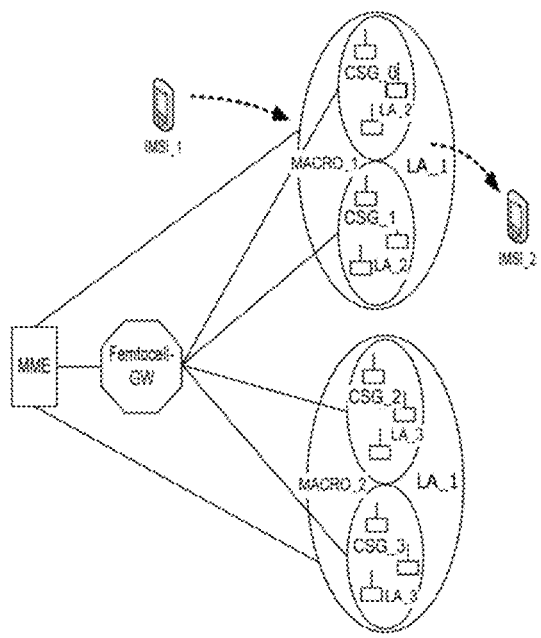
FIG. 7B illustrates a configuration of macrocells and femtocells in which the femtocells are connected to a femtocell gateway which connects to the mobility management entity that is connected to the macrocells.

A variant of the latter processes may be performed in a network portion configured as in FIG. 7B, in which the femtocells connect to MME through a gateway designated Femtocell-GW. According to this variant, at the end of the paging process MME establishes the session from IMSI_1 to IMSI_2 through CSG_0 which is connected to the network by the Femtocell-GW.

Figure 8:
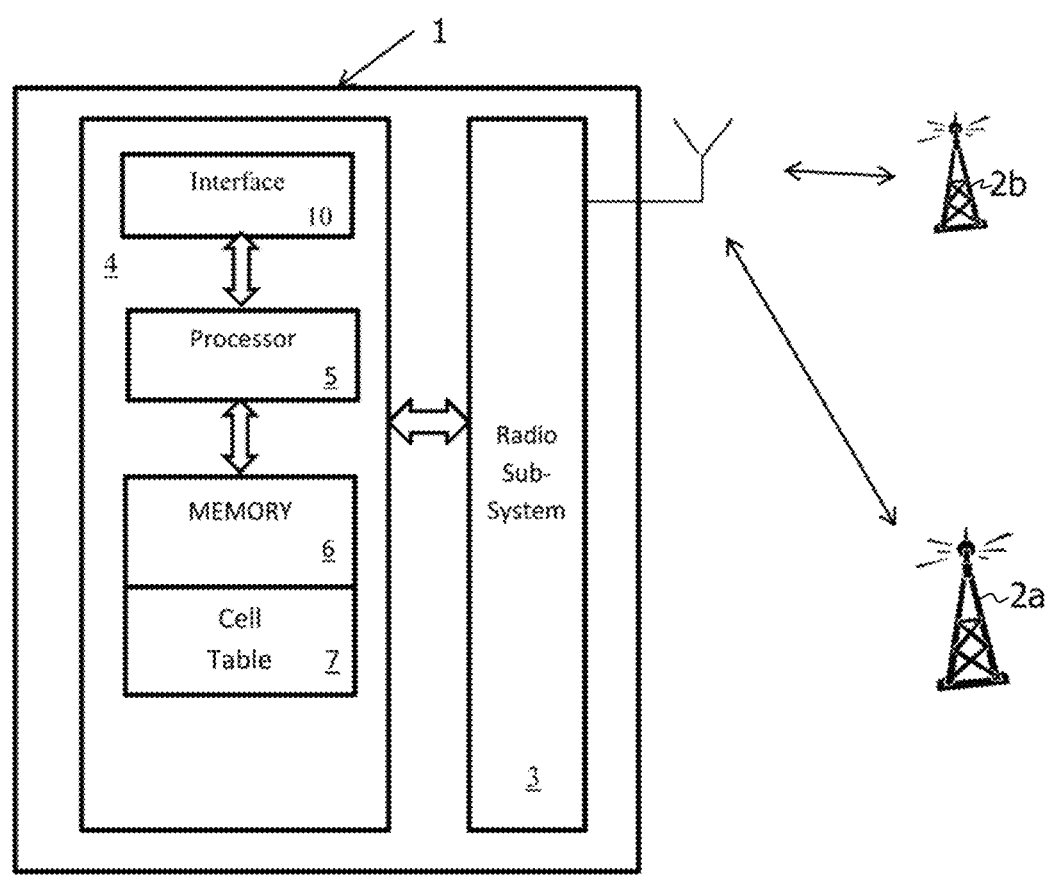
FIG. 8 is a diagram illustrating schematically some components in a mobile device according to one embodiment of the invention.

Certain methods discussed above relate to procedures implemented in a mobile user equipment to manage paging procedures involving selection of a paging cell and an access cell. Typically, user equipment is configured to perform the above-described methods by suitable programming of a processor in the user equipment. FIG. 8 is a simplified diagram illustrating some of the components in a user device 1 according to an embodiment of the present invention, configured to perform certain of the above-described paging-procedure management methods.

As illustrated in FIG. 8, the user device 1 is configured to communicate with transceivers 2a and 2b of a mobile network. Transceivers 2a may be relatively long-range radio equipment of a macrocell, whereas transceivers 2b may be relatively short-range equipment of femtocells. The UE 1 includes a radio sub-system 3 configured to handle communications between the UE and the transceivers 2a, 2b, as well as including a baseband sub-system 4. The radio sub-system 3 may be configured to provide the functions of acting as a receiver configured to detect transmissions from cells available to handle communications with the mobile device, and acting as a transmitter sub-system for transmitting various signals to the network, including transmissions of requests to register area identifiers as the location of the mobile device within the mobile network.

The baseband sub-system 4 includes a processor 5 as well as associated components which may include a memory 6 and one or more interfaces 10 (for example, an interface to device elements (not shown) such as a keyboard, touch-screen, and so on that may be operated by a user, an interface to a loudspeaker (not shown), and other interfaces). Other UE components may also be provided, as in conventional mobile devices, but these are not shown in FIG. 7 because their description is not pertinent to the explanation of the invention. The processor 5 of the UE 1 may be programmed to create a cell table 7 in the memory 6 and to hold in memory an indication (not shown) of the currently-selected paging cell and of the currently-selected access cell. The cell table 7 associates with each available cell that the radio sub-system 3 has detected a ranking or score representing this cell's paging capabilities and a ranking or score representing this cell's access capabilities. Typically, the ranking or score representing the cell's access capabilities relate to cell quality and may, for example, be based on one factor or a combination of factors such as signal strength detected for the cell, the cell's remaining capacity for handling traffic, and so on.

Typically the processor 5 is configured to update the rankings in the cell table 7 in a dynamic manner based on measurements made on the different available cells and/or based on paging-capability information and/or access-capability information transmitted by the cells, and to update the selection of the paging cell and access cell based on the changing values in the cell table 7.

The skilled person will readily understand that user equipment according to the present invention is not limited to devices which create an explicit cell ranking table in memory.

Although the invention has been described, in its various aspects, with reference to certain specific embodiments it is to be understood that various modifications and developments can be made without departing from the scope of the invention as defined in the appended claims.

The invention claimed is:

1. A method of managing a paging procedure in a cellular mobile network comprising different areas where mobile devices may be located, each location area of the network including at least one cell and the cellular mobile network comprising macrocells and femtocells, the method being performed by a mobile device connected to said network, the method comprising:
    detecting available cells of the network;
    selecting a first cell of the network as a paging cell whose location area is to be registered to the network as the paging area to be used by the network when paging the mobile device; and
    independently of the selection of the paging cell, selecting, as an access cell to be accessed by the mobile device when connecting to the network, a second cell of the network;
    wherein the mobile device is configured to select the paging cell based on parameters including the paging capabilities of the detected cells and to select the access cell based on parameters including the access capabilities of the detected cells; and
    the mobile device is configured to respond to a paging message received through the selected paging cell by contacting the network through the selected access cell;
    wherein the method further comprises the mobile device:
    recognizing whether detected available cells are macro-cells or femto-cells;
    associating a paging-capability parameter value and an access-capability parameter value to each detected cell;
    associating to detected available cells that are recognized as macro-cells a relatively higher paging capability parameter value compared to a paging capability parameter value associated to detected available cells that are recognized as femto-cells; and
    associating to detected available cells that are recognized as femto-cells a relatively higher access capability parameter value compared to an access capability parameter value assigned to detected available cells that are recognized as macro-cells;
    selecting the paging cell and access cell from among a group of detected cells having quality above a threshold level;
    selecting as the paging cell the cell having the highest value of paging-capability parameter from among the cells of said group; and
    selecting as the access cell the cell having the highest value of access-capability parameter from among the cells of said group.

2. A method according to claim 1, wherein:
    the associating associates a cell-quality value to cells as said access-capability parameter value; and
    the selecting selects as the paging cell the macrocell having best paging capabilities or best quality among the macrocells in said group or, if no macrocell is in said group, selects the femtocell having best paging capabilities or best quality among the femtocells in said group.

3. A method according to claim 1, wherein: when associating an access-capability parameter value to detected cells, the mobile device refers to parameters indicative of the communications quality of the detected cells.

4. A mobile device configured to be connectable to a cellular mobile network comprising different areas where mobile devices may be located, each location area of the network including at least one cell and the cellular mobile network comprising macrocells and femtocells, the mobile device comprising:
    a receiver configured to detect transmissions from cells available to handle communications with the mobile device; and
    a processor configured:
    to select a first cell of the network as a paging cell whose location area is to be registered to the network as the paging area to be used by the network when paging the mobile device; and
    independently of the selecting of the paging cell, to select, as an access cell to be accessed by the mobile device when connecting to the network, a second cell of the network;
    wherein the processor is configured to select the paging cell based on parameters including the paging capabilities of the detected cells and to select the access cell based on parameters including the access capabilities of the detected cells;
    wherein the mobile device is configured to respond to a paging message received through the paging cell selected by the processor by contacting the network through the access cell selected by the processor;
    wherein the processor is further configured:
    to recognize whether detected available cells are macro-cells or femto-cells,
    to associate a paging-capability parameter value and an access-capability parameter value to each detected cell:
    to associate to detected available cells that are recognized as macro-cells a relatively higher paging capability parameter value compared to a paging capability parameter value associated to detected available cells that are recognized as femto-cells;
    to associate to detected available cells that are recognized as femto-cells a relatively higher access capability parameter value compared to an access capability parameter value assigned to detected available cells that are recognized as macro-cells;
    to select the paging cell and access cell from among a group of detected cells having quality above a threshold level;
    to select as the paging cell the cell having the highest value of paging-capability parameter from among the cells of said group; and
    to select as the access cell the cell having the highest value of access-capability parameter from among the cells of said group.

5. A mobile device according to claim 4, wherein the processor is configured to determine the quality of the macrocells and femtocells detected by the receiver, and to select as the paging cell, from among the detected macrocells having quality above a threshold level, the macrocell having best paging capabilities of best quality or, if no macrocell is detected having quality above the threshold level, to select the highest-quality detected femtocell.

6. A non-transitory computer readable medium having stored thereon instructions, which, when executed by a processor of a mobile device, cause said mobile device to perform a method of managing a paging procedure in a cellular mobile network comprising different areas where mobile devices may be located, each location area of the network including at least one cell and the cellular mobile network comprising macrocells and femtocells, the method being performed by a mobile device connected to said network, the method comprising:

detecting available cells of the network;

selecting a first cell of the network as a paging cell whose location area is to be registered to the network as the paging area to be used by the network when paging the mobile device; and independently of the selection of the paging cell, selecting, as an access cell to be accessed by the mobile device when connecting to the network, a second cell of the network;

wherein the mobile device is configured to select the paging cell based on parameters including the paging capabilities of the detected cells and to select the access cell based on parameters including the access capabilities of the detected cells; and the mobile device is configured to respond to a paging message received through the selected paging cell by contacting the network through the selected access cell;

wherein the method further comprises the mobile device:

recognizing whether detected available cells are macro-cells or femto-cells;

associating a paging-capability parameter value and an access-capability parameter value to each detected cell;

associating to detected available cells that are recognized as macro-cells a relatively higher paging capability parameter value compared to a paging capability parameter value associated to detected available cells that are recognized as femto-cells; and associating to detected available cells that are recognized as femto-cells a relatively higher access capability parameter value compared to an access capability parameter value assigned to detected available cells that are recognized as macro-cells;

selecting the paging cell and access cell from among a group of detected cells having quality above a threshold level;

selecting as the paging cell the cell having the highest value of paging-capability parameter from among the cells of said group; and selecting as the access cell the cell having the highest value of access-capability parameter from among the cells of said group.

* * * * *